(12) United States Patent
Chan et al.

(10) Patent No.: US 8,976,702 B2
(45) Date of Patent: Mar. 10, 2015

(54) CO-CHANNEL UTILIZATION ESTIMATION

(75) Inventors: Douglas Chan, San Jose, CA (US); Tak Ming Francis Pang, Palo Alto, CA (US); Mohammad Janani, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 504 days.

(21) Appl. No.: 13/367,446

(22) Filed: Feb. 7, 2012

(65) Prior Publication Data

US 2013/0201863 A1  Aug. 8, 2013

(51) Int. Cl.
*H04W 24/00* (2009.01)
*H04W 24/08* (2009.01)
*H04W 28/02* (2009.01)

(52) U.S. Cl.
CPC .............. *H04W 24/08* (2013.01); *H04W 28/02* (2013.01)
USPC ........................................................ 370/253

(58) Field of Classification Search
CPC ..... H04W 24/08; H04W 28/20; H04W 92/20; H04W 84/12; H04W 2/0486
USPC .................... 370/252, 253, 311, 329; 455/453
See application file for complete search history.

(56) References Cited

U.S. PATENT DOCUMENTS

| | | | |
|---|---|---|---|
| 6,829,486 B2 | 12/2004 | McKenna et al. | |
| 7,075,906 B2 | 7/2006 | Douglas et al. | |
| 7,197,013 B2 | 3/2007 | Douglas et al. | |
| 7,280,607 B2 | 10/2007 | McCorkle et al. | |
| 7,363,008 B2 | 4/2008 | Hassan et al. | |
| 7,372,866 B2 | 5/2008 | Jang et al. | |
| 7,558,592 B2 | 7/2009 | Hart et al. | |
| 7,573,857 B1 | 8/2009 | Radhakrishnan et al. | |
| 7,593,356 B1 | 9/2009 | Friday et al. | |
| 8,155,482 B2 | 4/2012 | Chan et al. | |
| 2003/0054827 A1 | 3/2003 | Schmidl et al. | |
| 2004/0054774 A1 | 3/2004 | Barber et al. | |
| 2004/0062273 A1 | 4/2004 | Frank et al. | |
| 2006/0165103 A1 | 7/2006 | Trudeau et al. | |

(Continued)

FOREIGN PATENT DOCUMENTS

| | | |
|---|---|---|
| WO | 2006045097 A2 | 4/2006 |
| WO | 2006069176 A2 | 6/2006 |
| WO | 2006045097 A3 | 8/2006 |

OTHER PUBLICATIONS

International Search Report and Written Opinion, mailed May 17, 2013, in counterpart International Application No. PCT/US2013/021386.

Yu, et al., "An Adaptive Radio Resource Management Technique for APs in WLANs," IEEE International Conference on Networks (ICON'04), Nov. 2004, pp. 85-91.

(Continued)

*Primary Examiner* — Pao Sinkantarakorn
*Assistant Examiner* — Richard Chang
(74) *Attorney, Agent, or Firm* — Edell, Shapiro & Finnan, LLC

(57) ABSTRACT

Devices, methods and instructions encoded on computer readable media are provided herein for estimation of the available bandwidth in a frequency channel shared by a first access point and at least one neighboring access point. In one example, an impact value that represents the impact of traffic associated with the neighboring access point on the first access point is calculated. Based on the impact value, a first utilization metric associated with the first access point is generated. The first utilization metric represents the bandwidth available on the frequency channel in the presence of the traffic associated with the neighboring access point.

27 Claims, 7 Drawing Sheets

(56) References Cited

U.S. PATENT DOCUMENTS

| | | |
|---|---|---|
| 2006/0182073 A1 | 8/2006 | Pani et al. |
| 2010/0189199 A1 | 7/2010 | Lou et al. |
| 2010/0322141 A1 | 12/2010 | Liu et al. |
| 2011/0075613 A1 | 3/2011 | Yuan |
| 2011/0134866 A1 | 6/2011 | Frank et al. |
| 2011/0222486 A1 | 9/2011 | Hart |
| 2011/0243020 A1* | 10/2011 | Ponnuswamy ............... 370/252 |
| 2012/0147804 A1 | 6/2012 | Hedayat et al. |
| 2012/0163331 A1 | 6/2012 | Chan et al. |
| 2012/0224483 A1 | 9/2012 | Babiarz et al. |
| 2013/0010597 A1 | 1/2013 | Liu et al. |
| 2014/0098748 A1 | 4/2014 | Chan et al. |

OTHER PUBLICATIONS

Devin Akin: "802.11n 20/40 MHz BSS Mode Rules" CWNP Wireless Certification and Wireless Training, Aug. 29, 2007.

IEEE: IEEE P802.11n/D2.00 Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment: Enhancements for Higher Throughput Feb. 2007, pp. 199-202.

Kneckt, "Overlapping BSS Co-Existence," IEEE 802.11-10/1303r6, Nov. 11, 2010, pp. 1-19.

* cited by examiner

CO-CHANNEL UTILIZATION ESTIMATION

TECHNICAL FIELD

The present disclosure relates to the estimation of the utilization of a frequency channel shared by multiple wireless access points.

BACKGROUND

Certain wireless network architectures include one or more wireless access points (AP). Access points are specially configured nodes that allow wireless client devices to connect to a wired network (e.g., local area network) using Wi-Fi, Bluetooth or a related standard. The access points function as a central transmitter and receiver of radio signals and typically connect to a router (via a wired network), and can relay data between the client devices (such as computers or printers) and wired devices on the network.

In accordance with the Institute of Electrical and Electronics Engineers (IEEE) 802.11 standards, communication between a client device and an access point occurs over a frequency channel. The frequency channel is set in the access point, and the radio card in the client device automatically tunes its transceiver to the frequency of the access point of its choice.

In practice, it is common for several access points to share a frequency channel for communication with their respective clients. In such circumstances, the access points are referred to as co-channel access points.

DESCRIPTION OF EXAMPLE EMBODIMENTS

Overview

Devices, methods and instructions encoded on computer readable media are provided herein for estimation of the available bandwidth in a frequency channel shared by a first access point and at least one neighboring access point. In one example, an impact value that represents the impact of traffic associated with the neighboring access point on the first access point is calculated. Based on the impact value, a first utilization metric associated with the first access point is generated. The first utilization metric represents the bandwidth available on the frequency channel in the presence of the traffic associated with the neighboring access point.

Example Embodiments

Figure 1:
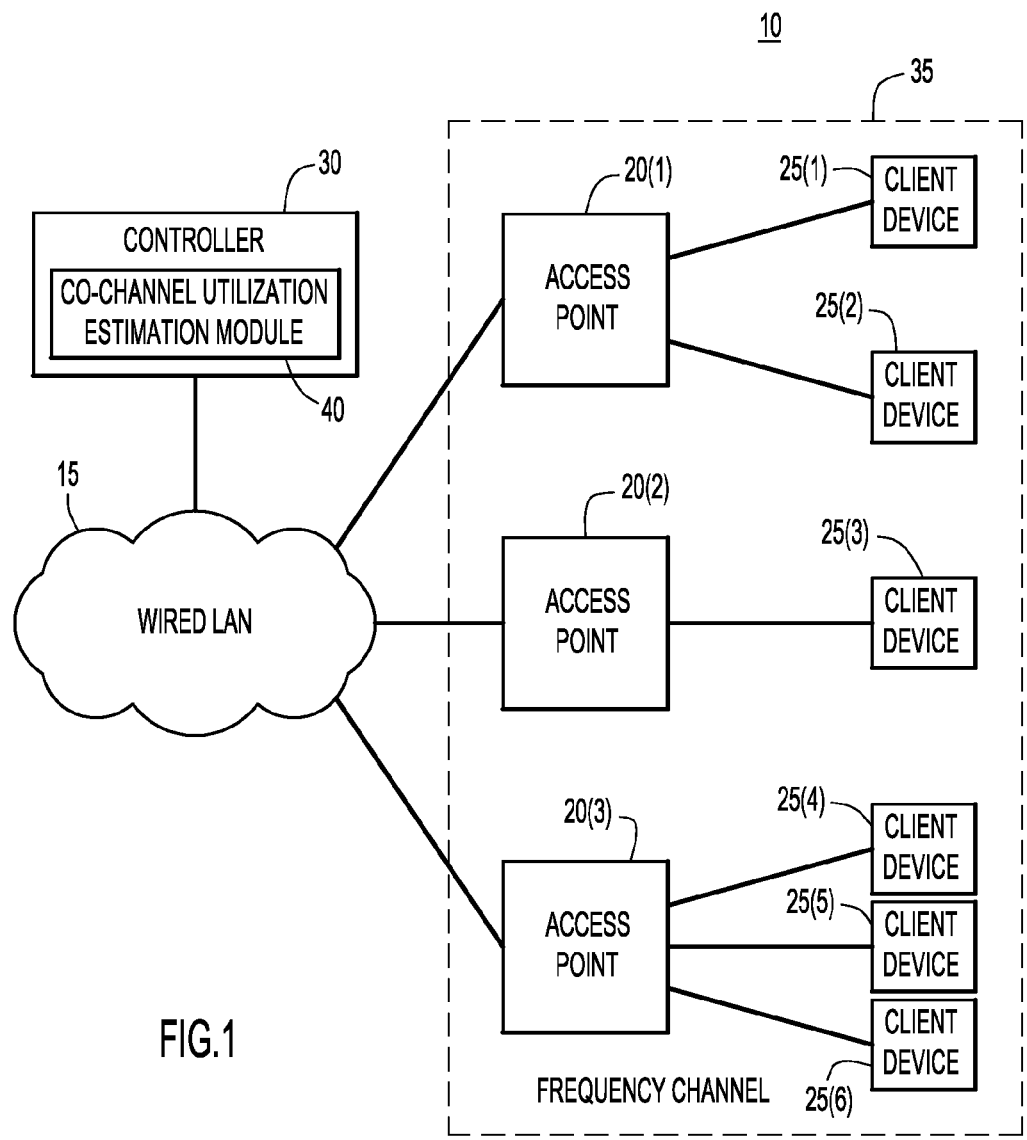
FIG. 1 is a block diagram of a network in which admission of a traffic stream to a shared frequency channel is based upon a utilization metric associated with a first access point.

FIG. 1 is a block diagram illustrating the architecture of a network 10 in a computing site, such as a building, campus, residence, etc. Network 10 includes a wired local area network (LAN) 15 to which three wireless access points 20(1)-20(3) are connected. Access point 20(1) is configured to wirelessly communicate with a client device 25(1) and a client device 25(2). Access point 20(2) is configured to wirelessly communicate with a client device 25(3), while access point 20(3) is configured to wirelessly communicate with a client device 25(4), a client device 25(5), and a client device 25(6). Connected to wired LAN 15 is a controller 30.

Access points 20(1)-20(3) are devices that allow the wireless client devices 25(1)-25(6) to connect to wired LAN 15 using Wi-Fi, Bluetooth, etc. The access points 20(1)-20(3) may connect to a router (not shown in FIG. 1). Client devices 25(1)-25(6) may be computers (e.g., desktops, laptops, or tablets), mobile devices (e.g., mobile phones, personal digital assistants (PDAs), or navigation units), peripheral devices (e.g., printers, scanners, fax machines, or copiers), etc.

In the example of FIG. 1, access points 20(1)-20(3) communicate with client devices 25(1)-25(6) over a frequency channel 35. Additionally, access points 20(1)-20(3) are sufficiently close together such that their transmissions to the client devices may overlap (i.e., their respective transmissions may cause co-channel interference with one another). Accordingly, access points 20(1)-20(3) are referred to herein as neighboring co-channel access points. As would be appreciated, access points 20(1)-20(3) share a finite over-the-air bandwidth that may be used for transmitting/receiving traffic (e.g., voice data, video data, etc.) to/from the client devices.

When a new traffic stream is requested for processing by a specific one of the access points 20(1)-20(3) (referred to herein as the first access point), the first access point will try to reserve bandwidth before accepting responsibility for processing the traffic stream. This reservation process occurs because once an access point 20(1)-20(3) accepts a traffic stream, the access point is required to provide a certain quality of service (QoS) to the stream. Therefore, unless the first access point is able to guarantee the required QoS, the first access point will reject the new traffic stream. In conventional arrangements, the ability to determine available bandwidth (needed for the QoS) is limited. As such, access points will under-admit traffic streams (i.e., reject traffic streams they could in fact handle) because, due to the shared nature of the frequency channel, the access points can not readily calculate the bandwidth available in the channel.

In conventional arrangements, to obtain information needed to accurately determine channel utilization, access points use a feature known as "promiscuous mode." In a typical mode of operation used for packet forwarding, an access point will look at headers of all packets, and drop any packets that are not intended for it. Dropped packets are not passed through (processed by) the access point. However, when in the promiscuous mode the access points will decode and process all of the packets on the shared frequency channel (even ones not intended for it). As such, the promiscuous mode is a processor intensive operation because the access point needs to inspect and process each packet. It is impossible for an access point to operate in promiscuous mode during packet forwarding because the access point does not have sufficient processing resources to process all of the packets. As such, there is a need for an accurate and easy way to calculate channel utilization in a shared frequency channel.

Described herein are techniques for determining utilization of, or conversely the availability of, a shared channel without the need for access points 20(1)-20(3) to operate in the promiscuous mode. These new techniques are sometimes referred to herein as co-channel utilization estimation techniques. In general, the channel utilization estimation techniques characterize co-channel traffic (e.g., voice and video) utilization impact on an individual access point. The utilization impact calculation makes use of either over-the-air duration usage estimated by a controller, or real time neighbor access point transmission statistics.

Controller 30 is a device (i.e., computer, server, etc.) that, in certain circumstances, is configured to control the operation of access points 20(1)-20(3) and perform the channel utilization estimation techniques. In the example of FIG. 1, controller 30 includes a co-channel utilization estimation module 40. Co-channel utilization estimation module 40 is a collection of one or more hardware or software components that collectively operate to estimate the availability of frequency channel 35.

The co-channel utilization estimation module 40 generates an estimate of the availability of frequency channel 35 (i.e., performs a co-channel utilization estimation technique) in terms of a value referred to as a utilization metric (UM). The utilization metric is a relative score (a normalized numerical value in the range of (and including) 0 to 1) that defines the bandwidth available to a first or selected access point amidst the traffic of its co-channel neighboring access points (i.e., the traffic associated with the co-channel access points that neighbor the first access point in the frequency channel). In other words, in a frequency channel shared by a first access point and one or more neighboring access points, the utilization metric provides a relative indication of how much bandwidth is available for use by the first access point.

The utilization metric is generated based on another value referred to herein as the impact value (M). The impact value is a normalized numerical value in the range of 0 and 1 that represents the impact of traffic associated with a neighboring access point on the first access point. In other words, the impact value is a conceptualized numerical representation of the impact of a traffic stream on the bandwidth of the channel.

The relationship between the utilization metric and the impact value is defined below in Equation 1.

$$UM=1-M \qquad \text{Equation 1:}$$

In accordance with Equation 1, a utilization metric of 1 means that the frequency channel is open, while a utilization metric of 0 means that the frequency channel is full. In other words, the higher the resulting utilization metric, then the relatively the better the channel is for admittance of additional traffic streams. A beneficial reason to calculate the utilization metric for a given access point is to determine whether the access point should admit new traffic streams (e.g., video or voice streams) when a client makes such a request. It would be appreciated that when the metric is below a certain threshold, then the access point will not admit any more new streams. Similarly, if the new stream is projected to add to the existing metric such that it goes over such a threshold, then the access point will reject the request.

An acceptable threshold of UM for admitting a particular traffic stream is dependent upon different factors such as the traffic stream and the network performance specification. In other words, acceptable UM thresholds will depend on the characteristics of the traffic, such as bit rate and resolution of the video stream. High quality videos with higher bit rate and resolution need more channel bandwidth than low quality videos. The acceptable threshold of UM for admitting a particular traffic stream may also depend on the expectation of the performance from a user's prospective. A higher expectation of performance needs a larger UM reservation to ensure the traffic quality.

It is to be appreciated that the utilization metric is specific for an access point sharing a frequency channel with one or more neighboring access points. For ease of illustration, examples will be described herein with reference to the calculation of a utilization metric associated with access point 20(1).

It is also to be appreciated that the impact values used during the calculation of the utilization are also specific for each neighboring access point. In other words, because each neighboring access point will individually impact the first access point, the utilization metric should account for the impact of each of the neighboring access points. In order to calculate the utilization metric associated with access point 20(1), a first impact value for access point 20(2) should be considered along with a second impact value for access point 20(3). Therefore, in the context of the calculation of the utilization metric for access point 20(1), Equation 1 may be re-written as shown below in Equation 2.

$$UM_{20(1)}=\Pi_i(1-(M_i)=(1-(M_{20(2)})*(1-M_{20(3)})) \qquad \text{Equation 2:}$$

where i is the number that indexes neighboring access points.

As such, in examples in which there are multiple neighboring access points, an impact value calculated for each of the access points, and each of these impact values are subtracted from the numerical value 1 to generate separate values corresponding to each neighboring access point. These separate values corresponding to each neighboring access point are then factored together to obtain the utilization metric associated with the first access point. As shown in Equation 2, these separate values that correspond to each of the neighboring access points are factored together through a multiplication process rather than through a simple addition process. The use of the multiplication process maintains the desired normalization (i.e., the numerical values remain in the range of 0 to 1).

The impact value for a neighboring access point is calculated based on several values. The first value used to calculate the impact value is the severity measure (S). The severity measure is a normalized numerical value in the range of 0 to 1 that represents the effects from the co-channel interference on the first access point that originates from the neighboring access point. The second value used to calculate the impact value is the traffic utilization measure (U). The traffic utilization measure has a normalized numerical value in the range of 0 and 1 and represents the over-the-air duration of the traffic associated with the neighboring access point (i.e., a numerical representation of the percentage of the time the neighboring access point is transmitting). Therefore, the impact value for a neighboring access point is given below in Equation 3. It will also be appreciated that the utilization measure can be specific for a group of certain traffic type, such as voice and video. In such a specific example, U represents the over-the-air duration of these specific traffic types associated with the neighboring access point, and the resulting utilization will be in regard to those specific traffic types.

$$M=S*U \qquad \text{Equation 3:}$$

In the context of the calculation of the utilization metric for access point 20(1), Equation 2 and Equation 3 may be combined as shown below in Equation 4.

$$UM_{20(1)}=(1-(S_{20(2)}*U_{20(2)}))*(1-(S_{20(3)}*U_{20(3)})) \qquad \text{Equation 4:}$$

In general, the severity measure may take into account received signal strength indicators (RSSIs), Packet Error Rates (PERs), Clear Channel Assessment Parameter (CCA) thresholds, and/or Carrier Sense Multiple Access thresholds or behavior. Several specific example techniques for determining the severity measure are provided below with reference to FIGS. 4A and 4B.

A numerical example of the above formulas may be helpful for understanding of the co-channel utilization estimation techniques. In one such example, the severity measures and the traffic utilization measures for each of access points 20(2) and 20(3), with respect to access point 20(1), are given below in Table 1.

TABLE 1

| Access Point | Severity Measure (S) | Traffic Utilization Measure (U) |
|---|---|---|
| 20(2) | 0.25 | 0.7 (70% transmission time) |
| 20(3) | 0.60 | 0.25 (25% transmission time) |

Therefore, using Equation 4 above, the utilization metric for access point 20(1) in the presence of neighboring co-channel access points 20(2) and 20(3) is given below in Equation 5.

$$UM_{20(1)}=(1-(0.25*0.7))*(1-(0.60*0.25))=0.701 \quad \text{Equation 5:}$$

It is to be appreciated that the architecture of network 10 shown in FIG. 1 is merely provided for purposes of illustration and that the co-channel utilization estimation techniques may be implemented in different network architectures. For example, in an alternative arrangement a network may have additional co-channel access points, while in another arrangement multiple controllers may be provided to operate collectively or individually to execute the co-channel utilization estimation techniques.

Figure 2:
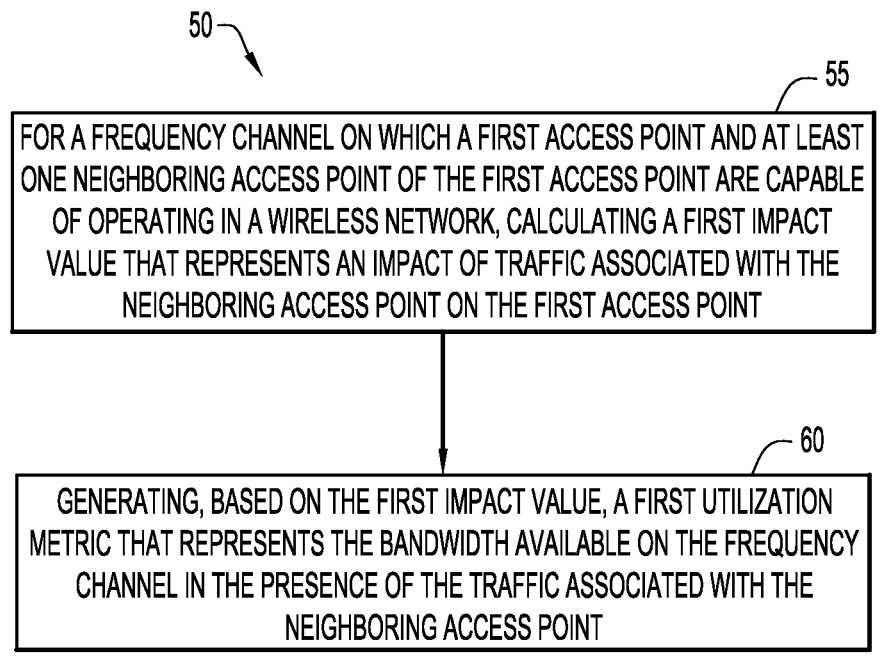
FIG. 2 is a flowchart illustrating a method for determining a utilization metric associated with a first access point.

FIG. 2 is a high-level flowchart illustrating a method 50 executed in accordance with an example co-channel utilization estimation technique. Method 50 is executed at a frequency channel that includes a first access point and at least one neighboring access point. As used herein, a method executed "at" a frequency channel refers to a method executed at an access point participating in the frequency channel, or a method executed at one or more devices directly or indirectly connected to an access participating in the frequency channel (e.g., an associated controller).

In method 50, an impact value is first calculated at 55. The impact value represents the impact of traffic associated with the neighboring access point on the first access point in the frequency channel. The impact value is a normalized numerical value in the range of 0 to 1.

At 60, the impact value is used to generate a utilization metric that represents the relative bandwidth available on the frequency channel to the first access point in the presence of the traffic associated with the neighboring access point. The utilization metric is a normalized numerical value in the range of 0 to 1.

Figure 3:
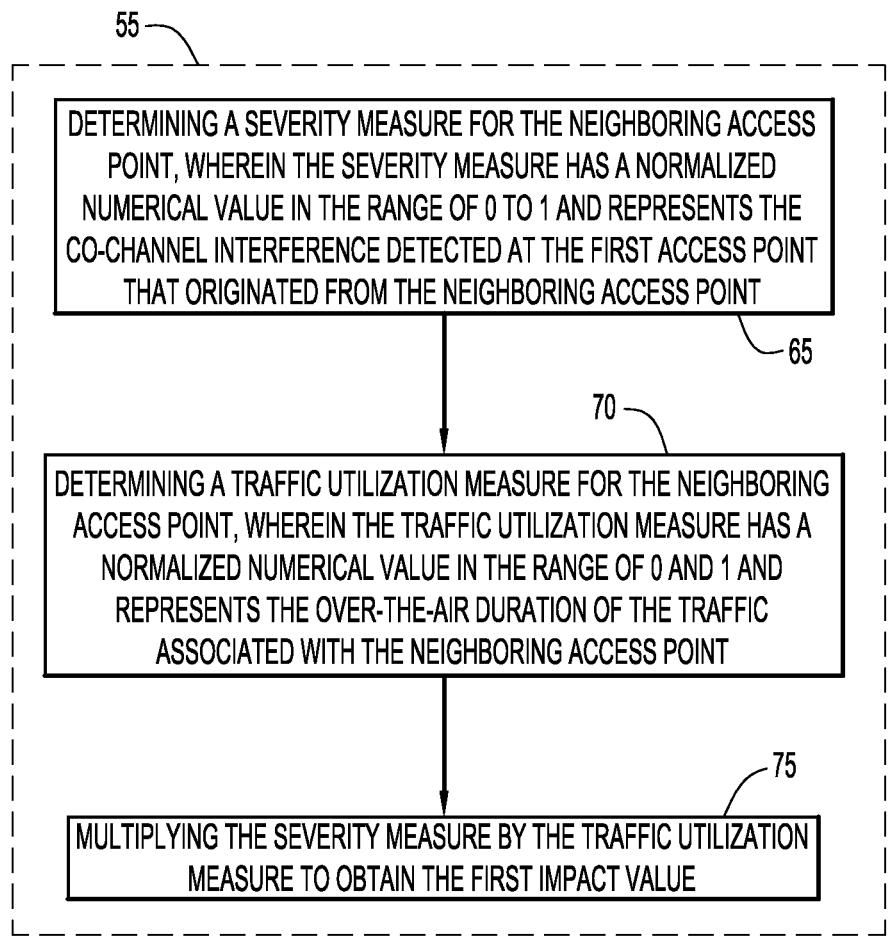
FIG. 3 is a flowchart illustrating the calculation of an impact value used to determine the co-channel utilization metric.

FIG. 3 is a detailed flowchart illustrating operations performed in accordance with one example of step 55 of FIG. 2. More specifically, at 65, a severity measure of co-channel interference from the neighboring access point on the first access point is determined. The severity measure has a normalized numerical value in the range of 0 to 1. In other words, the co-channel interference originating from the neighboring access point that affects the current access point is determined and converted to a numerical representation.

At 70, a traffic utilization measure for the neighboring access point is determined. The traffic utilization measure represents the over-the-air duration of the traffic associated with the neighboring access point. In one example, the traffic utilization measure can be determined from the amount of data for a traffic type of concern (e.g., a particular type of traffic) that the neighboring access point has to transmit, projecting the over-the-air duration of transmitting them in a window of time, and then dividing said projected duration over the window's duration. The traffic utilization measure has a normalized numerical value in the range of 0 to 1.

At 75, the severity measure is multiplied by the traffic utilization measure to obtain the impact value. Because the severity measure and the traffic utilization measure are both normalized numerical values in the range of 0 to 1, the resulting impact value will also be a normalized numerical value in the range of 0 to 1.

Figure 4A:
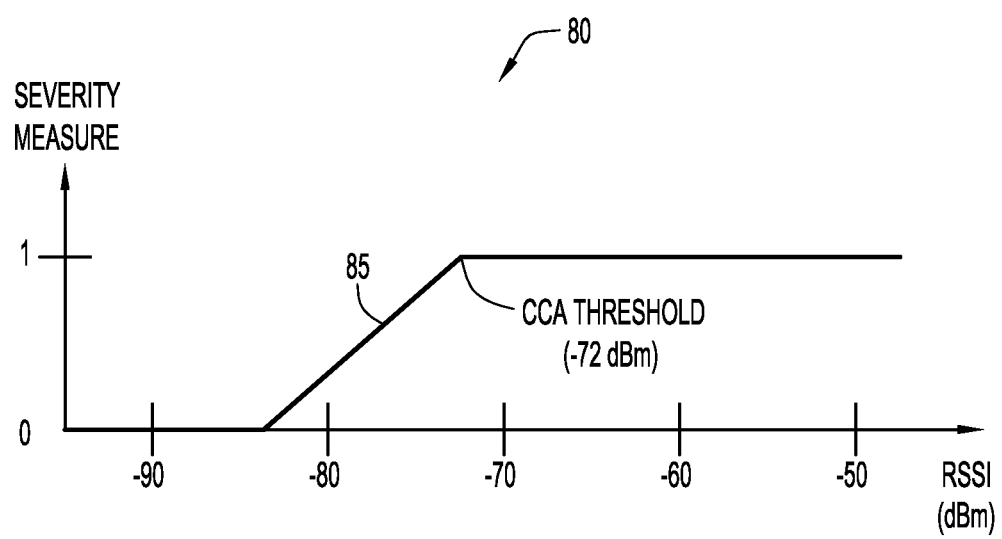
FIG. 4A is a graph illustrating a first method for determining a severity measure used to calculate an impact value.

As noted above, there are various methods to calculate the severity measure of a neighboring co-channel access point. FIG. 4A is a graph 80 illustrating one example in which the severity measure is determined based on RSSI. As is well known, RSSI is a measurement of the power present in a received radio signal. As such, in the example of FIG. 4A, the RSSI of signals received at the first access point from the neighboring access point is determined. The RSSI is then mapped to a numerical value in the range of 0 to 1 to form the severity measure. The determined RSSI may be mapped to the numerical value using an algorithm generated based on, for example, prior measurements/tests, prior calculations, etc.

When the RSSI is at a weak level, the transmissions from the neighboring co-channel access point generally do not to affect the first access point (i.e., there is no co-channel interference). Thus, when at a sufficiently low level such that there is no co-channel interference, the corresponding measured RSSIs may be mapped to a severity measure of 0. In this example, the signals have a sufficiently low level such that there is no co-channel interference when the RSSI of the signals are below approximately −84 decibels above a reference level of one milliwatt (dBm).

As the RSSI becomes higher (e.g., when the neighboring co-channel access is positioned closer to the first access point), the received signals will begin to impact performance (i.e., cause co-channel interference). However, when the RSSI is equal to or above the CCA threshold, the first access point and the neighboring access point will defer to each other's transmissions. As such, in practice, the signals from the neighboring access point cannot cause any more damage to the first access point above this threshold because they are at a point of sharing the channel. In this example, the CCA threshold of the system is assumed to be at −72 dBm. Thus, the mapping of RSSI beyond −72 dBm is at its maximum numerical value of 1.

Based on above, RSSI values of less than approximately −84 dBm are mapped to a value of 0 and RSSI values above approximately −72 dBm are mapped to a value of 1. RSSI values that fall between these two values are mapped to form the generally linear curve 85 shown in FIG. 4A. Therefore, in this example, the mapping exhibits a gradual increase in the severity measure between approximately −84 dBm and approximately −72 dBm.

Figure 4B:
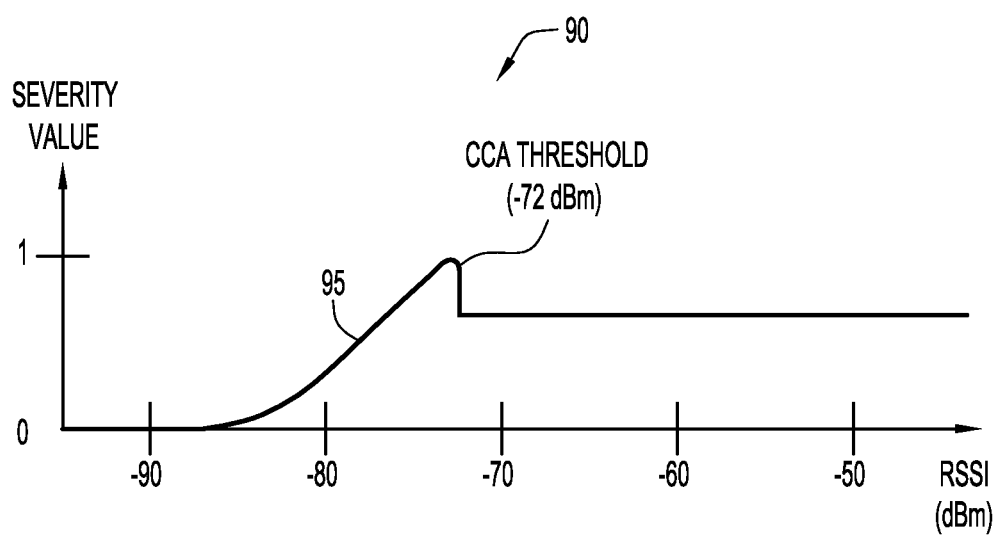
FIG. 4B is a graph illustrating a second method for determining a severity measure used to calculate an impact metric.

FIG. 4B is a graph 90 illustrating one example in which the severity measure is determined based on RSSI with respect to PER. More specifically, the PER is either measured or simulated for the RSSI in order to obtain a mapping of a finer granularity.

Similar to the above example, in graph 90 when the RSSI is at a weak level (i.e., below approximately −84 dBm) there is no co-channel interference and the severity measure is at a numerical value of 0. Additionally, as the RSSI becomes higher, the received signals will begin to impact performance (i.e., cause co-channel interference). Through the use of the PER enhancement, it is possible to determine that as the RSSI approaches the CCA threshold (−72 dBm), the PER is actually higher than other RSSIs. In the region near the CCA threshold, since the access points are not deferring to each other and are transmitting frames on top of each other, the signals are strong enough that they may corrupt each other's transmissions, thus causing collisions (increasing the PER relative to other RSSI values). Therefore, in the approach of FIG. 4B, the increase in PER is non-linear as the RSSI increases, resulting in a non-linear mapping curve 95. In the example of FIG. 4B, due to the resulting collisions just below the CCA threshold, the severity may be less when the RSSI is above the CCA threshold, than when the RSSI is just below the threshold.

The above description primarily relates to examples in which the utilization metric associated with a first access point is calculated based on the transmissions from one or more neighboring co-channel access points. These transmissions by the access points are referred to as downlink transmissions (i.e., transmissions from the access points to their associated client devices). It is to be appreciated that the access points also receive uplink transmissions (i.e., transmissions from the client devices to their associated access points) and that these uplink transmissions may also impact the bandwidth that is available within a frequency channel. As such, it may be beneficial to take into account the uplink transmissions during calculation of the utilization metric. In other words, the above described co-channel utilization estimation techniques may be extended to account for the uplink traffic as well.

In a simple example, a first access point ($AP_1$) shares a frequency channel with a single neighboring access point ($AP_2$) that has one client device associated therewith. The transmissions from the client device back to its associated access point ($AP_2$) will impact the bandwidth available for use by $AP_1$ (i.e., cause interference with $AP_1$). The interference at $AP_1$ resulting from the client device associated with $AP_2$ may be accounted for by first measuring the RSSI of transmissions from the client device back to $AP_2$. These measurements may be obtained, for example, from the RSSI of the client device's probe request frames that are received at $AP_1$ or by measuring the RSSI resulting from an uplink transmission from the client device to its associated access point.

The formula of Equation 1 can then be extended to factor in uplink traffic from client devices by adding an entry for each co-channel client device. In order to make this extension, several new values are defined. First, a new value referred to as the co-channel client impact value (C) is defined. The co-channel client impact value is a normalized numerical value in the range of 0 to 1 that represents the impact of traffic associated with the specific client device on the current access point. Second, a new value referred to as the client severity measure (R) is defined. The client severity measure is a normalized numerical value in the range of 0 to 1 that represents the severity of the client device's co-channel interference at the first access point. As noted above, client severity measure may be derived from RSSI received from the client's probe requests. Third, a new value referred to as the client traffic utilization measure (V) is defined. The client traffic utilization measure is a normalized numerical value in the range of 0 to 1 that represents the over-the-air duration of the traffic associated with client device. In one example, client traffic utilization measure can be determined from the amount of data for the traffic type of concern that the neighboring access point has to transmit, projecting the over-the-air duration of transmitting them in a window of time, and then dividing said projected duration over the window's duration. The relationship of these three values (channel client impact metric, client severity measure, and client traffic utilization measure) is given below in Equation 6.

$$C=R*V \qquad \text{Equation 6}$$

Adding these values to Equation 1, results in a new equation, shown below as Equation 7.

$$UM=(1-M)*(1-C) \qquad \text{Equation 7}$$

Figure 5:
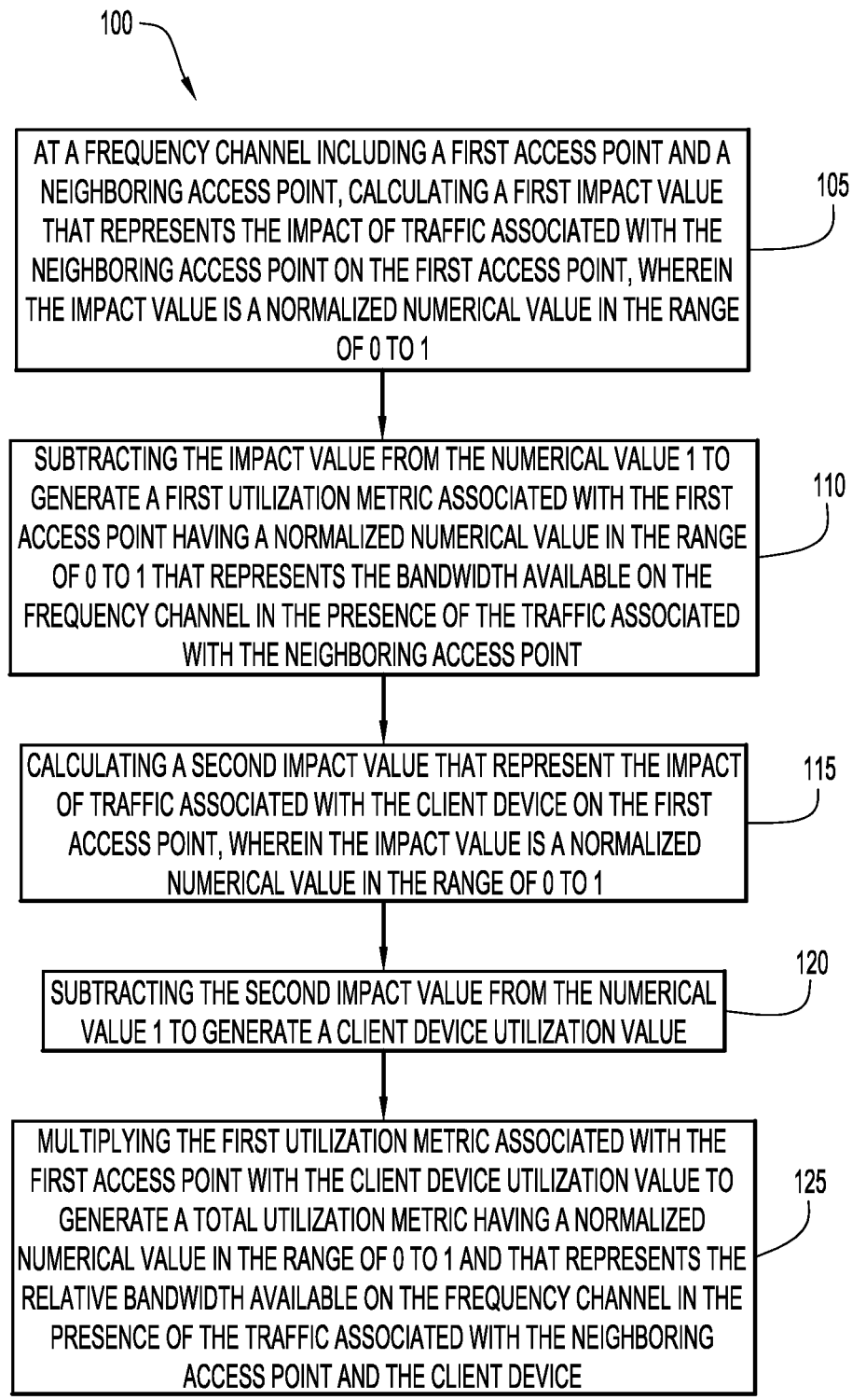
FIG. 5 is a flowchart illustrating a further method for determining a utilization metric associated with a first access point.

FIG. 5 is high-level flowchart illustrating a method 100 executed in accordance with an example co-channel utilization estimation technique that considers the impact of client devices. For ease of illustration, method 100 is implemented at a frequency channel that includes a first access point, a single neighboring access point, and a single client device associated with the neighboring access point.

In method 100, an impact value is first determined at 105. As noted above with reference to FIG. 2, this impact value represents the impact of traffic associated with the neighboring access point on the first access point in the frequency channel. The impact metric is a normalized numerical value in the range of 0 to 1.

At 110, the impact value is subtracted from the numerical value 1 in order to generate a first utilization metric. The first utilization metric is a normalized numerical value in the range of 0 to 1 that represents the relative bandwidth available on the frequency channel to the first access point in the presence of the traffic associated with the neighboring access point.

Next, at 115, a second impact value is determined. The second impact value represents the impact of traffic associated with the client device on the first access point. The second impact value is a normalized numerical value in the range of 0 to 1. At 120, the second impact value is subtracted from the numerical value 1 in order to generate a client device utilization value. The client device utilization value is a normalized numerical value in the range of 0 to 1 that represents the relative bandwidth available on the frequency channel to the first access point in the presence of the traffic associated with the client device.

At 125, the first utilization metric is multiplied by the client device utilization value to generate a total utilization metric. The total utilization metric is a normalized numerical value in the range of 0 to 1 and represents the relative bandwidth available on the frequency channel in the presence of the neighboring access point and the client device.

As noted above, FIG. 5 illustrates a simple example in which the frequency channel includes a first access point, a single neighboring access point, and a single client device associated with the neighboring access point. It would be appreciated that in certain circumstances a first access point may have multiple neighboring access points and multiple client devices that are associated with each of the neighboring access points. In such cases, the total utilization metric ($UM_{Total}$) for the first access point is given below in Equation 8.

$$UM_{Total}=\Pi_i(1-M_i)*\Pi_j(1-C_j), \qquad \text{Equation 8}$$

where i is the number that indexes neighboring access points and j is the number that indexes client devices associated with the neighboring access points.

In certain examples, a weight can be associated with each device to promote the importance or relevancy of each device. In such circumstances, the Equation 8 may be written as shown below in Equation 9.

$$UM_{Total}=[\Pi_i W_i(1-M_i)*\Pi_j W_j(1-C_j)]/[\Sigma_i W_i+\Sigma_j W_j]. \qquad \text{Equation 9}$$

Using the above client example, if it is determined that client impact is secondary and that it is most important to account for the impact from APs, then weights may be assigned such that Equation 9 is rewritten as shown below in Equation 10.

$$UM_{Total}=[5(1-M_i)*1(1-C_j)]/[5+1].$$ Equation 10

In other examples, the weights can be made zero. In such examples, the associated device is not relevant to the final metric.

Figure 6:
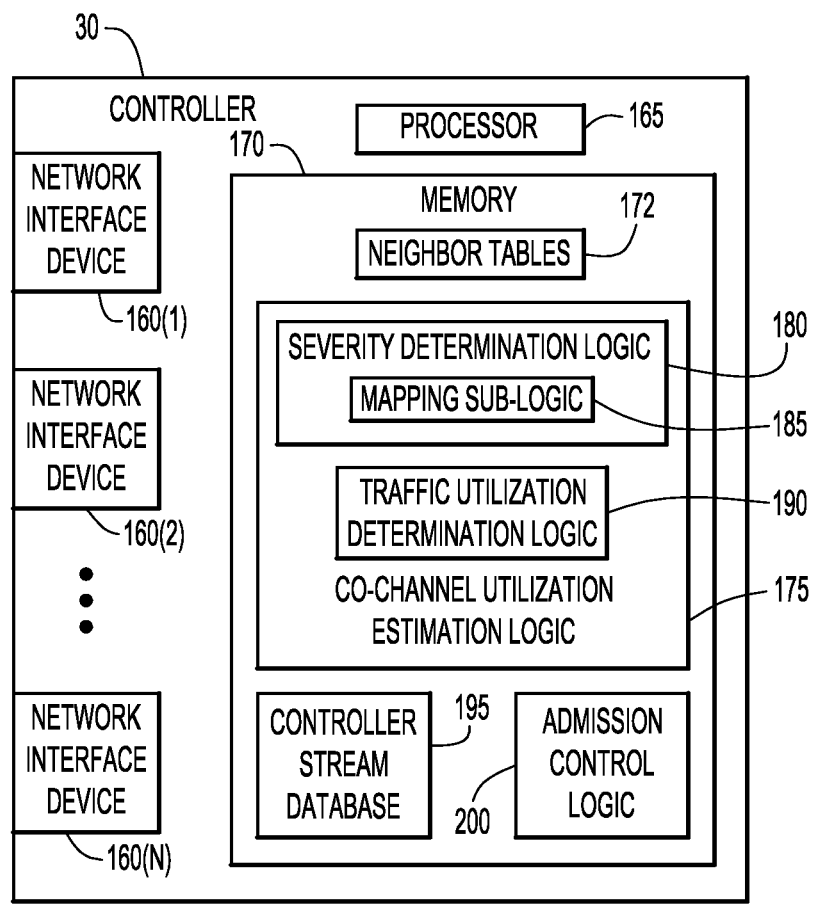
FIG. 6 is a block diagram of a controller configured to execute co-channel utilization estimation techniques.

FIG. 6 is a block diagram illustrating further details of controller 30 of FIG. 1. Controller 30 comprises one or more antennas 155, a plurality of network interfaces 160 (1)-160 (N), a processor 165, and a memory 170. Memory 170 comprises one or more neighbor tables 172, and co-channel utilization estimation logic 175 that includes severity determination logic 180 and traffic utilization determination logic 190. Severity determination logic 180 further comprises mapping sub-logic 185. Memory 170 also includes a controller stream database 195 and admission control logic 200. For ease of illustration, the examples of FIG. 6 will be described with reference to the network architecture of FIG. 1 and the calculation of a total utilization metric for access point 20(1).

In operation, controller 30 is configured to record all of the traffic streams (e.g., voice and video streams) going to each access point 20(1)-20(3) in controller stream database 195. In one example, the controller 30 notes the packet sizes, bit rates, and transmission queues used by the access points 20(1)-20(3) for the traffic streams to their client devices 25(1)-25(6). Alternatively, each access point 20(1)-20(3) can collect transmission statistics and report those statistics to controller 30 on-demand. That is, in such an alternative arrangement, the access points 20(1)-20(3) collect the statistics and transmit them to the controller 30 when the controller decides to compute the co-channel utilization. In certain circumstances, after the access points 20(1)-20(3) send the statistics to the controller 30, the statistics can be kept on the controller for a short period of time for use in future related calculations. This reduces the messaging overhead because there is no need for the controller to request the same data.

In the example of FIG. 6, a new traffic stream has been requested for processing by access point 20(1). In order to determine if this stream may be accepted, controller 30 is configured to execute the above described co-channel utilization estimation techniques. More specifically, controller 30 is configured to calculate (using Equation 8) a total utilization metric that accounts for the co-channel interference and channel utilization of each of the neighboring access points 20(2) and 20(3), as well as the client devices 25(2)-25(6) associated with these two neighboring access points.

Different methods may be executed for generating of a client utilization measure. In one example, the client utilization measure is calculated by measuring the air time of client transmission to its associated Access Point. In another example, the client utilization measure is calculated by measuring and counting the data rate or packet size of the traffic transmitted by the client.

In general, the total utilization metric is determined in FIG. 6 through the execution of co-channel utilization estimation logic 175 in memory 170 As such, FIG. 6 illustrates a primarily software implementation of co-channel utilization estimation module 40 (shown in FIG. 1). It would be appreciated that in alternative arrangements the co-channel utilization estimation module 40 may be implemented with digital logic gates in one or more application-specific integrated circuits (ASICs).

To calculate the total utilization metric, controller 30 first identifies all the co-channel access points using neighbor table 172. The client devices associated with the neighboring access points can be identified because the controller 30 has a record of all the associated clients' MAC addresses. In this case, the neighboring access points are access points 20(2) and 20(3), and the co-channel client devices are client devices 25(2)-25(6). Next, the controller 30 calculates the utilization metric for access point 20(1) using impact values for each of the identified neighboring access points 20(2) and 20(3), as well as the client devices 25(2)-25(6). As noted above, these impact values are generated based on severity measures and traffic utilization measures for each of neighboring access points 20(2) and 20(3) and the client devices 25(2)-25(6). As such, co-channel utilization estimation logic 175 includes severity determination logic 180 that, when executed by processor 165, is configured to generate the severity measures for the access points and client devices. Severity determination logic 180 includes mapping sub-logic 185 that, when executed by processor 165, maps RSSI and/or other measurements to a numerical severity measure. Mapping sub-logic 185 may be implemented as a table, algorithm, etc. Also included in co-channel utilization estimation logic 175 is traffic utilization determination logic 190 that, when executed, is configured to determine the traffic utilization measures of access points 20(2) and 20(3) and the client devices 25(2)-25(6).

Furthermore, co-channel utilization estimation logic 175, when executed by processor 165, is configured to determine the current transmission utilization of access point 20(1) (i.e., the bandwidth used by the access point 20(1)) and the current transmission utilization of client device 25(1) communicating with access point 20(1) Using the above total utilization metric that accounts for the traffic of all the neighboring devices (access points 20(2) and 20(3) and the client devices 25(2)-25(6)), and the current transmission utilization of access point 20(1) and client device 25(1), admission control logic 200, when executed by processor 165, is configured to determine if the requested stream may be admitted for processing by access point 20(1). In other words, the controller 30 can accurately estimate if there is available bandwidth in the channel to admit a new traffic stream (i.e., video request, voice call, etc.).

Memory 170 may comprise read only memory (ROM), random access memory (RAM), magnetic disk storage media devices, optical storage media devices, flash memory devices, electrical, optical, or other physical/tangible memory storage devices. Processor 165 is, for example, a microprocessor or microcontroller that executes instructions for the co-channel utilization estimation logic 175. Thus, in general, the memory 150 may comprise one or more tangible computer readable storage media (e.g., a memory device) encoded with software comprising computer executable instructions and when the software is executed (by the processor 165) it is operable to perform the operations described herein in connection with co-channel utilization estimation logic 175.

FIG. 6 illustrates an example in which the co-channel utilization estimation techniques are implemented on a controller 30. It would be appreciated that, in an alternative arrangement, the techniques may be implemented on an access point, such as access point 20(1) of FIG. 1. In such an example, the access point 20(1) would include a processor, co-channel utilization estimation logic, and admission control logic 220 as described above.

The co-channel utilization estimation techniques described herein may provide one or more advantages over conventional arrangements. For example, by employing statistics that are on the controller, namely the voice/video streams statistics, the resulting utilization metric will be accurate and does not have the same shortcomings that may arise with access point measured values, which would otherwise need the performance-impacting promiscuous mode to be invoked. Additionally, by providing an accurate assessment of the utilization with co-channel access points, an implemented admission control mechanism can operate properly and react more correctly to dynamic changes to the traffic streams in the network.

Furthermore, as the computing power of the controller increases (i.e., through more powerful hardware), more system-wide designs and protocols can be implemented on the controller rather than at the access points. When compared to existing design architecture where decision and statistics collection are distributed at the access points, these new techniques will free up resources on the access points Also, the neighbor table and the traffic stream statistics already exist on the controller. Therefore, the admission control mechanism can use the locally calculated co-channel utilization estimation without needing to retrieve those statistics from individual access points through messaging. This introduces resource savings when compared to conventional methods.

Also, the above described co-channel utilization estimation techniques take into consideration of effect of signal-to-noise (SNR) and received RSSI from neighboring access points the co-channel utilization metric is calculated. These essential measurements are not considered in conventional techniques.

In addition to the examples described above, accuracy and/or reliability may be improved by placing the radio into promiscuous mode for short periods of time in order to measure the amount of co-channel interference coming from both in-network and overlapping APs that do not belong to the same network. Additionally, examples may show improvement by employing an additional radio to the AP that is dedicated to monitoring co-channel interferences. It will be appreciated that both of these additional examples include both uplink and downlink traffic.

The above description is intended by way of example only.

What is claimed is:

1. A method comprising:
    for a frequency channel on which a first access point and at least one neighboring access point of the first access point are capable of operating in a wireless network, calculating a first impact value that represents an impact of traffic associated with the neighboring access point on the first access point, wherein the calculating includes:
        determining a severity measure for the neighboring access point that represents co-channel interference detected at the first access point that originated from the neighboring access point;
        determining a traffic utilization measure for the neighboring access point that represents an over-the-air duration of the traffic associated with the neighboring access point; and
        multiplying the severity measure by the traffic utilization measure to obtain the first impact value; and
    generating, based on the first impact value, a first utilization metric that represents the bandwidth available on the frequency channel in the presence of the traffic associated with the neighboring access point.

2. The method of claim 1, wherein calculating the first impact value comprises:
    calculating a normalized numerical value in the range of 0 to 1.

3. The method of claim 1, wherein generating the first utilization metric comprises:
    subtracting the first impact value from a numerical value 1 to generate a normalized numerical value in the range of 0 to 1.

4. The method of claim 1, wherein a client device communicates with the neighboring access point via the frequency channel, further comprising:
    calculating a second impact value that represents an impact of traffic associated with the client device on the first access point, wherein the second impact value is a normalized numerical value in the range of 0 to 1;
    subtracting the second impact value from a numerical value 1 to generate a client device utilization value;
    generating, based on the second impact value, a second utilization metric that represents the bandwidth available on the frequency channel in the presence of the traffic associated with the client device; and
    multiplying the first utilization metric with the second utilization metric to generate a total utilization metric having a normalized numerical value in the range of 0 to 1 and that represents the relative bandwidth available on the frequency channel in the presence of the traffic associated with the neighboring access point and the client device.

5. The method of claim 1, further comprising:
    receiving a request for the addition of a traffic stream to the frequency channel; and
    evaluating the first utilization metric to determine if the traffic stream may be admitted to the frequency channel.

6. The method of claim 3, wherein:
    the determining a severity measure includes determining the severity measure to have a normalized numerical value in the range of 0 to 1;
    the determining a traffic utilization measure includes determining the traffic utilization measure to have a normalized numerical value in the range of 0 and 1.

7. The method of claim 4, further comprising:
    determining a current transmission utilization of the first access point;
    generating, based on the current transmission utilization of the first access point and the total utilization metric, a numerical representation of the total bandwidth available on the channel.

8. The method of claim 6, wherein determining the traffic utilization measure for the neighboring access point comprises:
    obtaining the amount of data for a traffic type of concern to be transmitted by the neighboring access point;
    projecting the over-the-air duration of the transmissions for the traffic type of concern during a time window having a time duration; and
    dividing the projected over-the-air duration of the transmissions by the time duration of the time window.

9. The method of claim 6, wherein determining the severity measure associated with the neighboring access point comprises:
    mapping received signal strength indications, taken at the first access point, of transmissions from the neighboring access point to the normalized numerical value in the range of 0 to 1.

10. One or more non-transitory computer readable storage media encoded with software comprising computer executable instructions and when the software is executed operable to:
    for a frequency channel on which a first access point and at least one neighboring access point of the first access point are capable of operating in a wireless network, calculate a first impact value that represents an impact of traffic associated with the neighboring access point on the first access point by:
  determining a severity measure for the neighboring access point that represents co-channel interference detected at the first access point that originated from the neighboring access point;
  determining a traffic utilization measure for the neighboring access point that represents an over-the-air duration of the traffic associated with the neighboring access point; and
  multiplying the severity measure by the traffic utilization measure to obtain the first impact value; and
generate, based on the first impact value, a first utilization metric that represents the bandwidth available on the frequency channel in the presence of the traffic associated with the neighboring access point.

11. The computer readable storage media of claim 10, wherein the instructions operable to calculate the first impact value further comprise instructions operable to:
  calculate a normalized numerical value in the range of 0 to 1.

12. The computer readable storage media of claim 10, wherein a client device communicates with the neighboring access point via the frequency channel, further comprising instructions operable to:
  calculate a second impact value that represents an impact of traffic associated with the client device on the first access point, wherein the second impact value is a normalized numerical value in the range of 0 to 1;
  subtract the second impact value from a numerical value 1 to generate a client device utilization value;
  generate, based on the second impact value, a second utilization metric that represents the bandwidth available on the frequency channel in the presence of the traffic associated with the client device; and
  multiply the first utilization metric associated with the second utilization metric to generate a total utilization metric having a normalized numerical value in the range of 0 to 1 and that represents the relative bandwidth available on the frequency channel in the presence of the traffic associated with the neighboring access point and the client device.

13. The computer readable storage media of claim 10, further comprising instructions operable to:
  receive a request for the addition of a traffic stream to the frequency channel; and
  evaluate the first utilization metric to determine if the traffic stream may be admitted to the frequency channel.

14. The computer readable storage media of claim 10, wherein the instructions operable to generate the first utilization metric comprise instructions operable to:
  subtract the first impact value from a numerical value 1 to generate a normalized numerical value in the range of 0 to 1.

15. The computer readable storage media of claim 12, further comprising instructions operable to:
  determine a current transmission utilization of the first access point; and
  generate, based on the current transmission utilization of the first access point and the total utilization metric, a numerical representation of the total bandwidth available on the channel.

16. The computer readable storage media of claim 14, wherein the instructions operable to calculate the first impact value further comprise instructions operable to:
  determine a severity measure such that the severity measure has a normalized numerical value in the range of 0 to 1;
  determine a traffic utilization measure such that the traffic utilization measure has a normalized numerical value in the range of 0 and 1.

17. The computer readable storage media of claim 16, wherein the instructions operable to determine the traffic utilization measure for the neighboring access point comprise instructions operable to:
  obtain the amount of data for a traffic type of concern to be transmitted by the neighboring access point;
  project the over-the-air duration of the transmissions for the traffic type of concern during a time window having a time duration; and
  divide the projected over-the-air duration of the transmissions by the time duration of the time window.

18. The computer readable storage media of claim 16, wherein the instructions operable to determine the severity measure associated with the neighboring access point comprise instructions operable to:
  map received signal strength indications, taken at the first access point, of transmissions from the neighboring access point to the normalized numerical value in the range of 0 to 1.

19. An apparatus comprising:
  one or more network interface devices configured to communicate with a first access point and at least one neighboring access point of the first access point that are capable of operating in a frequency channel of a wireless network; and
  a processor coupled to the network interface and configured to:
    calculate a first impact value that represents an impact of traffic associated with the neighboring access point on the first access point by:
      determining a severity measure for the neighboring access point that represents co-channel interference detected at the first access point that originated from the neighboring access point;
      determining a traffic utilization measure for the neighboring access point that represents an over-the-air duration of the traffic associated with the neighboring access point; and
      multiplying the severity measure by the traffic utilization measure to obtain the first impact value; and
    generate, based on the first impact value, a first utilization metric that represents the bandwidth available on the frequency channel in the presence of the traffic associated with the neighboring access point.

20. The apparatus of claim 19, wherein the processor is configured to calculate the first impact value by calculating a normalized numerical value in the range of 0 to 1.

21. The apparatus of claim 19, wherein the processor is configured to generate the first utilization metric by subtracting the first impact value from a numerical value 1 to generate a normalized numerical value in the range of 0 to 1.

22. The apparatus of claim 19, wherein a client device communicates with the neighboring access point via the frequency channel, and wherein the processor is further configured to:
  calculate a second impact value that represent an impact of traffic associated with the client device on the first access point, wherein the second impact value is a normalized numerical value in the range of 0 to 1;
  subtract the second impact value from a numerical value 1 to generate a client device utilization value;

generate, based on the second impact value, a second utilization metric that represents the bandwidth available on the frequency channel in the presence of the traffic associated with the client device; and multiply the first utilization metric associated with the second utilization metric to generate a total utilization metric having a normalized numerical value in the range of 0 to 1 and that represents the relative bandwidth available on the frequency channel in the presence of the traffic associated with the neighboring access point and the client device.

23. The apparatus of claim 19, wherein the processor is further configured to:

receive a request for the addition of a traffic stream to the frequency channel; and evaluate the first utilization metric to determine if the traffic stream may be admitted to the frequency channel.

24. The apparatus of claim 21, wherein the processor is further configured to calculate the first impact value by:

determining a severity measure such that the severity measure has a normalized numerical value in the range of 0 to 1;

determining a traffic utilization measure such that the traffic utilization measure has a normalized numerical value in the range of 0 and 1.

25. The apparatus of claim 22, wherein the processor is further configured to:

determine a current transmission utilization of the first access point;

generate, based on the current transmission utilization of the first access point and the total utilization metric, a numerical representation of the total bandwidth available on the channel.

26. The apparatus of claim 24, wherein the processor is configured to determine the traffic utilization measure for the neighboring access point by:

obtaining the amount of data for a traffic type of concern that is to be transmitted by the neighboring access point;

projecting the over-the-air duration of the transmissions for the traffic type of concern during a time window having a time duration; and dividing the projected over-the-air duration of the transmissions by the time duration of the time window.

27. The apparatus of claim 24, wherein the processor is configured to determine the severity measure associated with the neighboring access point by:

mapping received signal strength indications, taken at the first access point, of transmissions from the neighboring access point to the normalized numerical value in the range of 0 to 1.

* * * * *